United States Patent [19]

Meckel et al.

[11] 4,240,861
[45] Dec. 23, 1980

[54] PROCESS FOR THE PREPARATION OF DIHYDROXYPOLYURETHANES AND THE USE THEREOF AS ADHESIVES OR AS RAW MATERIALS FOR ADHESIVES

[75] Inventors: Walter Meckel, Neuss; Horst Müller-Albrecht, Cologne; Manfred Dollhausen, Odenthal; Eugen Velker, Dormagen, all of Fed. Rep. of Germany

[73] Assignee: Bayer Aktiengesellschaft, Leverkusen, Fed. Rep. of Germany

[21] Appl. No.: 39,702

[22] Filed: May 17, 1979

Related U.S. Application Data

[63] Continuation of Ser. No. 925,582, Jul. 17, 1978, abandoned.

[30] Foreign Application Priority Data

Jul. 28, 1977 [DE] Fed. Rep. of Germany ....... 2734102

[51] Int. Cl.$^3$ ............................................ C08G 18/34
[52] U.S. Cl. ..................................... 156/331; 528/71; 528/905
[58] Field of Search .................. 156/331; 528/71, 905

[56] References Cited

U.S. PATENT DOCUMENTS

| | | | |
|---|---|---|---|
| 3,479,310 | 11/1969 | Dieterich et al. | 260/29.2 TN |
| 3,658,939 | 4/1972 | Carpenter et al. | 161/190 |
| 3,773,729 | 11/1973 | Wakimoto et al. | 528/71 |
| 3,994,764 | 11/1976 | Wolinski | 156/331 |
| 4,156,064 | 5/1979 | Falkenstein et al. | 156/331 |

*Primary Examiner*—Maurice J. Welsh
*Attorney, Agent, or Firm*—Gene Harsh; Joseph C. Gil; R. Brent Olson

[57] ABSTRACT

The instant invention is directed to a process for the preparation of dihydroxypolyurethanes containing carboxyl groups and chemically fixed ionic groups, comprising reacting
(A) dihydroxypolyesters having molecular weights of from 600 to 8,000;
(B) organic diisocyanates;
(C) compounds containing carboxyl groups and groups having a higher isocyanate-reactivity than said carboxyl groups; and
(D) compounds containing ionic groups and isocyanate-reactive groups wherein the products of said process contain from 0.01 to 1.0%, by weight of carboxyl groups and from 0.1 to 10 milliequivalents of ionic groups per 100 g of polyurethane.

30 Claims, No Drawings

PROCESS FOR THE PREPARATION OF DIHYDROXYPOLYURETHANES AND THE USE THEREOF AS ADHESIVES OR AS RAW MATERIALS FOR ADHESIVES

This is a continuation of application Ser. No. 925,582 filed July 17, 1978, now abandoned.

BACKGROUND OF THE INVENTION

The use of substantially linear hydroxypolyurethanes as raw materials for gluing various substances, such as plasticizer-containing PVC or natural or synthetic rubbers, either to surfaces of the same material or to other materials has been described in German Auslegeschrift No. 1,256,822.

One disadvantage of these adhesives is that they do not adhere sufficiently firmly to certain types of rubber, particularly to soft, transparent rubber. Furthermore, this defect may only be improved by an additional, rather complicated operation. Among the numerous pre-treatments of rubber surfaces which have been described in the literature may be mentioned the painting of the surface with oxidizing acids, such as sulfuric acid (German Pat. No. 807,719), halogenation using compounds which split off chlorine or bromine (German Offenlegungsschrift No. 2,550,823) and application of a pre-coat of polychloroprene or other halogen-containing polymer (U.S. Pat. No. 3,917,742). All these methods involve an additional process step and therefore increase the cost. They may also give rise to toxic products, e.g. in the case of the pre-treatment with sulfuric acid or halogens, which require elaborate protective measures.

The improvement in the adherence of polyurethanes to various materials by the incorporation of ions (especially cations) has been repeatedly described (e.g. D. Dieterich, W. Keberle and H. Witt, Ang. Chemie 82, 53–63 (1970)). U.S. Pat. No. 3,658,939 discloses the improvement obtained in the adherence of polyurethanes to metal surfaces when the polyurethane applied from solution contains free carboxyl groups which have been chemically fixed by way of 2,2-dimethylol-propionic acid.

However, the adherence of such polyurethanes to various rubber materials is not sufficiently strong. Moreover, the inadequate resistance to separation of rubber materials which have been glued using such modified polyurethanes cannot be improved by simply increasing the ionic or carboxyl groups in the polyurethane.

Indications as to how the disadvantages described above may be obviated are found in German Auslegeschrift No. 2,113,631 which teaches the addition of carboxylic acids, preferably fumaric acid, to commercial polyurethane adhesive solutions, whereby a considerable improvement in adherence to rubber materials is obtained without any elaborate pre-treatment. One disadvantage of this method, however, is the powerful hydrolytic action of the added substances on the basic polyurethane which considerably reduces both the stability of the adhesives in storage and the strength of the bonds, particularly at elevated temperatures in a moist climate.

It has now surprisingly been found that dihydroxypolyurethanes which contain both chemically fixed ionic groups and chemically fixed carboxyl groups and which are prepared by the process according to the invention described below are eminently suitable for gluing rubber. The obtainable resistances to separation of the bonds are substantially higher than those obtained using polyurethanes known in the art. Additionally, the disadvantages mentioned above, which are observed when carboxylic acids are added to solutions of polyurethane adhesives, no longer occur. The novel products obtained by the process according to the present invention are suitable for bonding a variety of different substrates.

DESCRIPTION OF THE INVENTION

The present invention thus relates to a process for the preparation of dihydroxypolyurethanes containing carboxyl groups and chemically fixed ionic groups, comprising reacting (A) dihydroxypolyesters having molecular weights of from 600 to 8000 and optionally diols having molecular weights of from 62 to 300; (B) organic diisocyanates; (C) compounds containing carboxyl groups and groups having a higher isocyanate-reactivity than said carboxyl groups; and (D) compounds containing ionic groups and isocyanate-reactive groups. Components (C) and (D) are separate compounds. The reaction may take place with or without solvents. The reaction may be by the one-shot process or the prepolymer process.

The present invention also relates to dihydroxypolyurethanes which are obtainable by this process and to the use thereof as adhesives or as raw materials for adhesives for gluing substantially any substrate and in particular for gluing rubber to rubber or to other materials.

The starting materials for the process include organic diisocyanates, dihydroxy-polyesters, optionally low molecular weight chain-lengthening agents, and both compounds containing carboxyl groups and compounds containing ionic groups, each of which has preferably two isocyanate-reactive groups. The products obtained by the process are therefore predominantly linear polyurethanes. However, the possibility of also using small quantities of higher than functional starting components in the process for example small quantities of trimethylol propane, in order to obtain a certain degree of branching, is not excluded since such slight branching of the products according to the present invention is often advantageous.

Suitable diisocyanates for the process are in particular those corresponding to the following general formula:

wherein

Q represents an aliphatic hydrocarbon group having from 4 to 10 and preferably 6 carbon atoms, a cycloaliphatic hydrocarbon group having from 5 to 15 and preferably from 6 to 13 carbon atoms, an aromatic hydrocarbon group having from 6 to 15 and preferably from 7 to 13 carbon atoms, or an araliphatic hydrocarbon group having 8 carbon atoms.

Aromatic diisocyanates are preferably used for the process according to the present invention. Typical representatives of suitable diisocyanates are, for example, the following: butane-1,4-diisocyanate; hexane-1,6-diisocyanate; cyclohexylene-1,4-diisocyanate; 1-methyl-2,4-diisocyanato-cyclohexane; 1-methyl-2,6-diisocyanato-cyclohexane; 1-isocyanato-3-isocyanatomethyl-3,5,5-trimethyl-cyclohexane; 2,4- and 2,6-diisocyanato-toluene; 4,4'-diphenylmethane diisocyanate; 4,4'-diphenylpropane diisocyanate and mixtures of such diisocyanates. 4,4'-diphenylmethane diisocyanate is particularly preferred.

Suitable dihydroxypolyesters for the process are, in particular, those having a molecular weight above 600, preferably from 1200 to 6000, and most preferably from 2000 to 4000, such as those obtained in known manner from alkane dicarboxylic acids preferably having at least 6 carbon atoms and alkane diols preferably having at least 4 carbon atoms. Suitable dicarboxylic acids include, for example, adipic acid, pimelic acid, suberic acid, azelaic acid, sebacic acid, and the like. Suitable alkane diols include, for example, butane-1,4-diol, pentane-1,5-diol and hexane-1,6-diol. Dihydroxypolycarbonates are also suitable polyesters, especially those based on hexane-1,6-diol, as well as esterification products of straight-chain hydroxy alkane monocarboxylic acids having preferably 5 or more carbon atoms which contain hydroxyl end groups, e.g. ε-hydroxycaproic acid, or the corresponding lactone polymers.

Dihydroxypolyesters of adipic acid and butane-1,4-diol and of adipic acid and hexane-1,6-diol, dihydroxypolyesters based on ε-caprolactam and dihydroxypolyhexamethylene carbonates within the above-mentioned molecular weight ranges are particularly suitable.

The process is often carried out with the aid of the known chain-lengthening agents used in polyurethane chemistry although they are not absolutely essential. These chain-lengthening agents include in particular, diols or diol mixtures having molecular weights of from 62 to 300, preferably from 62 to 150. Suitable diols of this type are, for example ester diols within the above-mentioned molecular weight range, such as terephthalic acid-bis-2-hydroxyether ester, and ether diols within the said molecular weight range, e.g. hydroquinone-bis-2-hydroxyethyl ether. However, it is preferred to use simple alkane diols having from 2 to 8, preferably from 4 to 6, carbon atoms as chain-lengthening agents, such as ethylene glycol, trimethylene glycol, tetramethylene glycol, pentamethylene glycol or hexamethylene glycol, the chain-lengthening agents are generally used in quantities providing from 0 to 1, preferably from 0.3 to 0.7, mol of chain-lengthening agent per mol of the dihydroxypolyester. When a mixture of at least two of the above-mentioned chain-lengthening agents is used, as is often preferred, for example a mixture of tetramethylene glycol, and hexamethylene glycol, the quantities mentioned above refer to each of the glycols present in the mixture so that the total quantity of glycol mixture provided may be up to 2 mol, preferably up to 1.4 mol, of glycol per mol of dihydroxypolyester.

Essential to the present invention is the use of the following compounds when carrying out the process:
(a) compounds which contain carboxyl groups and which in addition contain groups which have a higher isocyanate-reactivity than the carboxyl groups; and
starting components which contain ionic groups and isocyanate-reactive groups.

The compounds mentioned under (a) and (b) are used in such quantities that the products of the process contain from 0.01 to 1.0 and preferably from 0.02 to 0.4% by weight of carboxyl groups (—COOH) and from 0.1 to 10 and preferably from 0.5 to 4 milliequivalents of ionic groups per 100 g of resin.

By "ionic groups" are meant in this context, in particular, ammonium groups, sulfonium groups, carboxylate groups, sulfonate groups or phosphonate groups, all bound by homopolar bonds. The preferred ionic groups are the sulfonate groups —SO$_3^\ominus$.

The starting components mentioned under (a) are preferably dihydroxycarboxylic acids, in particular 2,2-dimethylol-propionic acid or dihydroxycarboxylic acids, such as tartaric acid, or dihydroxycarboxylic acids which contain ester groups, for example the compounds which may easily be obtained by the reaction of dicarboxylic acid anhydrides, such as tetrahydrophthalic acid anhydride, with trimethylolpropane in a molar ratio of 1:1.

In accordance with what has been said above, suitable examples of starting components mentioned under (b) are diols preferably containing phosphonate groups, carboxylate groups, sulfonate groups, ammonium groups or sulfonium groups. Moreover, when preparing products which contain ammonium groups, particularly when solvents are used for carrying out the process, one could employ a method of incorporating diols containing tertiary amine nitrogen atoms into the polyurethane with the tertiary nitrogen atoms subsequently being converted into quaternary ammonium groups by quaternization, for example using dimethyl sulfate, only after the polyurethane has been synthesized. The ionic starting components preferably have two aliphatically bound hydroxyl groups.

Examples of suitable glycols containing ammonium groups include the quaternization products of alkoxylated amines, preferably N-alkyl-dialkanolamines corresponding to the following general formula:

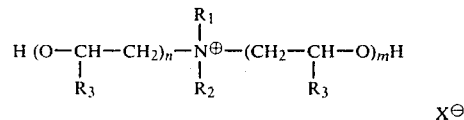

wherein
n and m each represents an integer of from 1 to 20, preferably 1;
$R_1$ represents $C_1$-$C_8$ alkyl, preferably $CH_3$;
$R_2$ represents $C_1$-$C_8$ alkyl, preferably $CH_3$, $C_2H_5$, $C_3H_7$ or $C_4H_9$;
$R_3$ represents H or $CH_3$, preferably H; and
$X^\ominus$ represents $R_1$—O—$SO_3^\ominus$ or a halide ion, such as $CL^{(-)}$, $Br^{(-)}$ or $I^{(-)}$.

A typical example of a diol containing sulfonium groups would be a compound corresponding to the following general formula:

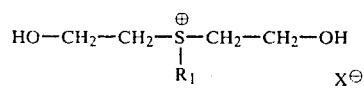

wherein $R_1$ and X are as defined above.

Examples of suitable glycols containing sulfonate groups are the ionic starting components corresponding to the following general formula which are particularly preferred for the process:

$$H-(O-CH-CH_2)_n-O-(A)_o-CH-(B)_p-O-(CH_2-CH-O-)_mH$$
$$\phantom{H-(O-}R_4 \phantom{-CH-CH_2)_n-O-(A)_o-}(CH_2)_q \phantom{-O-(CH_2-CH-O-)_m}R_4$$
$$\phantom{H-(O-CH-CH_2)_n-O-(A)_o-CH-(B)_p-O-(CH_2-}SO_3^\ominus Y^\oplus$$

wherein

A and B, which may be the same or different, each represents an aliphatic hydrocarbon group having from 1 to 6 carbon atoms;

$R_4$ = represents H or $CH_3$;

$Y^\oplus$ represents an alkali metal cation or a substituted or unsubstituted ammonium group;

n and m, which may be the same or different, each represents a number from 0 to 30;

o and p each represents 0 to 1; and q represents an integer of from 0 to 2;

compounds corresponding to the following general formula:

$$\begin{array}{c} HO-CH-CH_2 \\ | \\ R_5 \\ \phantom{HO-CH-CH_2}\diagdown \\ \phantom{HO-CH-CH_2-}N-CH_2-SO_3^\ominus Y^\oplus \\ \phantom{HO-CH-CH_2}\diagup \\ HO-CH-CH_2 \\ | \\ R_5 \end{array}$$

wherein $Y^\oplus$ is as defined above; and $R_5$ represents a $C_1$-$C_8$ alkyl group or a hydrogen atom, preferably a hydrogen atom; or compounds corresponding to the following general formulae:

[Structure: benzene ring with $Y^\oplus O_3^\ominus S$— substituent and two —O—(A'—O—)$_o$H substituents]

[Structure: benzene ring with $Y^\oplus O_3^\ominus S$— substituent and —N with two (A'—O—)$_o$H branches]

wherein $Y^\oplus$ is as defined above; and

A' represents a group of the following formula:

$$-CH_2-CH-$$
$$\phantom{-CH_2-}|$$
$$\phantom{-CH_2-}R_4$$

wherein $R_4$ is as defined above; and o represents an integrer of from 1 to 15.

Suitable starting components containing carboxylate groups include the alkali metal or ammonium salts of the dihydroxycarboxylic acids exemplified above. The said ammonium salts may be substituted on the ammonium group.

Suitable diols containing phosphonate groups include compounds corresponding to the following general formula:

$$\begin{array}{c} HO-CH_2-CH_2 \phantom{aaaaa} O \phantom{a} O-R_5 \\ \phantom{HO-CH_2-CH_2aa}\diagdown \phantom{aaa} \| / \\ \phantom{HO-CH_2-CH_2aaaa} N-CH_2-P \phantom{aaaa} \text{and} \\ \phantom{HO-CH_2-CH_2aa}\diagup \phantom{aaaaaaaaaa}\diagdown \\ HO-CH_2-CH_2 \phantom{aaaaaaaaaaaa} O^\ominus Y^\oplus \end{array}$$

-continued $$\begin{array}{c} \phantom{HO-CH_2-CH-CH_2-P}O \\ \phantom{HO-CH_2-CH-CH_2-P}\|/ \\ HO-CH_2-CH-CH_2-P \phantom{aaaa} O-R_5 \\ | \phantom{aaaaaaaaaaaaaa}\diagdown \\ OH \phantom{aaaaaaaaaaaaa} O^\ominus Y^\oplus \end{array}$$

wherein $Y^\oplus$ and $R_5$ are as defined above.

The ionic starting components preferably contain two aliphatically bound hydroxyl groups and at least one ammonium, sulfonium, carboxylate, sulfonate or phosphonate group and are otherwise inert under the conditions of the process. Such ionic starting components for the preparation of ionically modified polyurethanes include the difunctional dionic starting components described in U.S. Pat. No. 3,479,310, German Offenlegungsschriften Nos. 2,446,440; 2,426,401; 2,417,664 and 2,410,862 and U.S. Pat. No. 3,708,303 and the ionic starting components obtained by quaternization or neutralization of the potential ionic groups contained in the corresponding starting components having potential ionic groups described in the said literature references, which are difunctional in the isocyanate addition reaction.

The diols containing ionic groups or carboxyl groups are preferably used as separate starting components in the process, although one could also use the low molecular weight glycols having ionic groups mentioned above as starting components for the preparation of the dihydroxy polyesters which are to be used in the process. In other words, the ionic groups could already be incorporated into the end products at the stage of the dihydroxypolyesters used in the process. The quantity of starting components containing carboxyl groups or ionic groups used for carrying out the process is calculated so that the amount of carboxyl groups and ionic groups present in the products obtained by the process lies within the range indicated above.

The process is preferably carried out as a one-shot process, i.e. by reacting the diisocyanate component with a mixture of all the components which have isocyanate-reactive hydrogen atoms, preferably solvent-free at from 50° to 200° C., preferably from 80° to 150° C., and at a molar NCO/OH ratio of from 0.9:1 to 0.999:1 so that the products of the process will invariably contain hydroxyl end groups. The reaction may also be carried out in the presence of inert solvents, e.g. tolune, methylethyl ketone, ethyl acetate or dimethylformamide, or in the presence of mixtures of such solvents.

The process may also be carried out as a prepolymer process, for example by reacting the polyester component with the diisocyanate component in a molar NCO- /OH ratio above 1:1 at from 50° to 150° C. to produce an isocyanate prepolymer which is subsequently chain-lengthened using a mixture of a glycol containing carboxyl groups, a glycol containing ionic groups and optionally a simple glycol chain-lengthening agent at from 80° to 200° C. Both preparation of the prepolymers and the chain-lengthening reaction may be carried out solvent-free or in the presence of solvents. Variations are also possible; for example, one or two of the above-mentioned types of glycols may already be used at the stage of preparation of the isocyanate prepolymer, the chain-lengthening reaction being then carried out with the addition of only the remaining types of glycols.

The products obtained by the process are valuable adhesives or raw materials for adhesives for bonding any substrates, in particular for bonding rubber to rubber or to other materials. For the practical application the products of the process are applied in the form of solutions in suitable solvents, for example, of the type exemplified above, or as solvent-free melts. The products of the process are preferably used in the form of from 10 to 40%, by weight, solutions in polar solvents, such as acetone or methylethyl ketone. The viscosity of these adhesive solutions may be adapted to the particular requirements of the bonding process or to the materials which are to be bonded by varying the hydroxypolyurethane content. Preparation of the solutions of the hydroxypolyurethanes which are to be used is advantageously carried out by simply dissolving the polyurethanes at room temperature or slightly elevated temperature in the polar solvents used. If preparation of the hydroxypolyurethanes was carried out in solution, the apolar solvent which may have been used for preparing the hydroxypolyurethanes may either first be evaporated off or a quantity of polar solvent suitable for the particular purpose may be added to the system without first removing the apolar solvent. When polar solvents are used for the preparation of the polyurethanes, the solutions obtained may be used as such.

Natural or synthetic resins, such as phenol resins, ketone resins, colophony derivatives, phthalate resins, acetylor nitro-celluloses or other substances, e.g. silicate fillers, may be added to the adhesives described above in order to obtain particular properties, e.g. to increase the contact bonding time. Cross-linking agents, for example higher functional polyisocyanates, such as phosphoric acid-tris-isocyanato-phenyl ester or tris-isocyanato-tolyl-isocyanurate, may also be added to the adhesive solutions.

The products obtained from the process may also be processed from the melt. In both cases, the adhesives, either as solutions or as solvent-free melts, are applied to the surfaces which are to be bonded, if indicated after first roughening or in some other way pre-treating the surfaces. The adhesives may be applied by roller, brush, spatula, spray-gun or some other device. The coats of applied adhesive are heated to evaporate off most of the solvent and activate them, for example to temperatures of from ca. 50° to 150° C., preferably from ca. 55° to 100° C. and are then immediately joined together under pressure. In a preferred embodiment of the present invention, a liquid synthetic resin heated to from 120° to 200° C., for example a vinyl chloride polymer containing plasticizer, is applied by a process of spray casting to a surface which is already covered with a partly dried layer of adhesive.

Numerous materials, such as paper, cardboard, wood, metal or leather, may be powerfully bonded by means of the products obtained by the process. The products are particularly suitable for bonding rubber materials and other synthetic resins, inter alia polyurethane foams which have a non-celluar surface and, provided they otherwise conform to German Pat. No. 1,256,822 in the composition thereof, also homopolymers and copolymers of vinyl chloride which contain plasticizer, especially for bonding shoe soles made of these materials to shoe shanks made of leather or synthetic leather.

The products of the process are also eminently suitable for use as coatings for various substrates, in particular, for rubber.

EXAMPLES

The following starting materials were used in the Examples which follow:

Ionic Starting Components

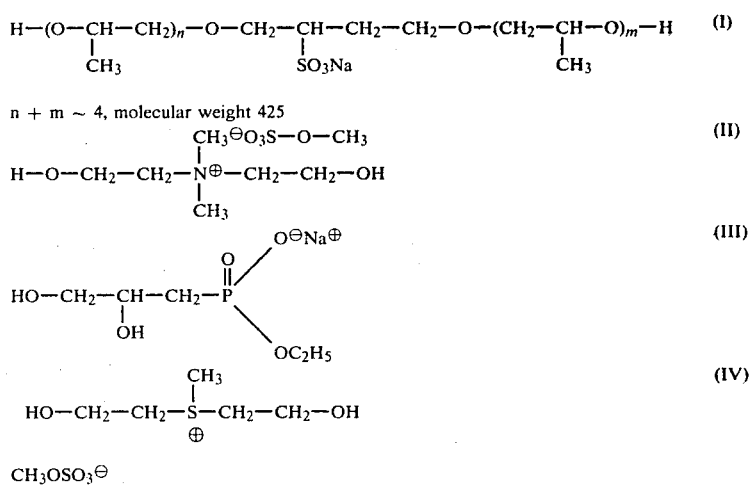

Polyesters (A) Hexane diol-1,6-polyadipate; hydroxyl number 49.8
(B) Polycaprolactone; hydroxyl number 55.7
(C) Hexane diol polyadipate; hydroxyl number 37.5

EXAMPLES 1 to 12

Preparation of the polyurethanes (general method of preparation)

1 mol of the polyester is mixed with the number of mols of chain-lengthening agent (butanediol or hexanediol) indicated in Table 1, the number of mols of ionic starting components indicated in Table 1 and the number of mols of dimethylol propionic acid indicated in Table 1. The mixture is then dehydrated in a water jet vacuum at 100° C.

The number of mols of 4,4'-diisocyanato-dipheynlmethane indicated in Table 1 are then added to the diol mixture at 120° C. The reaction mixture is stirred for 2 minutes. The hot melt is then poured into a "Teflon" dish and tempered in a heating cupboard for 15 hours at 110° C. A solid product is obtained on cooling to room temperature. As 15% solution in methylethyl ketone, the product has the viscosity indicated in Table 1.

TABLE 1

| Example | Polyester | Chain-lengthening agent | Ionic Addition | Dimethylol propionic acid | 4,4'-diphenyl methane | mPas, 15% in MEK, 25° C. |
|---|---|---|---|---|---|---|
| 1 | 1 mol (A) | 0.4 mol butanediol-1,4 | 0.1 mol (I) | 0.12 mol | 1.56 | 870 |
| 2 | 1 mol (A) | 0.4 mol butanediol-1,4 | — | 0.12 mol | 1.50 mol | 950 |
| 3 | 1 mol (A) | 0.4 mol butanediol-1,4 | 0.1 mol (I) | — | 1.48 mol | 800 |
| 4 | 1 mol (A) | 0.4 mol butanediol-1,4 | 0.05 mol (II) | — | 1.44 mol | 1050 |
| 5 | 1 mol (A) | 0.4 mol butanediol-1,4 | 0.05 mol (II) | 0.05 mol | 1.48 mol | 900 |
| 6 | 1 mol (C) | 0.3 mol butanediol-1,4 a. 0.3 mol hexanediol-1,6 | 0.05 mol (I) | 0.05 mol | 1.67 mol | 1000 |
| 7 | 1 mol (A) | 0.4 mol hexanediol-1,6 | 0.2 mol (I) | 0.2 mol | 1.76 mol | 800 |
| 8 | 1 mol (B) | 0.4 mol hexanediol-1,6 | 0.05 mol (I) | 0.05 mol | 1.48 mol | 650 |
| 9 | 1 mol (A) | 0.4 mol hexanediol-1,6 | 0.11 mol (III) | 0.05 mol | 1.54 mol | 900 |
| 10 | 1 mol (A) | 0.4 mol hexanediol-1,6 | 0.05 mol (IV) | 0.05 mol | 1.48 mol | 800 |
| 11 | 1 mol (A) | 0.4 mol hexanediol-1,6 | | 0.5% fumaric acid to the adhesive solution | 1.38 mol | 1000 |
| 12 | 1 mol (A) | 0.4 mol hexanediol-1,6 | — | — | 1.38 mol | 1000 |

The following materials were bonded together, using the adhesive solutions mentioned in Table 1

Material A

Vulcanized styrene-butadiene rubber of shore hardness 96, mechanically roughened.

Material B

Vulcanized styrene-butadiene rubber of shore A hardness 61, mechanically roughened.

To bond the test samples, both sides are coated with 250 g/m² of the solution of adhesive, the solvent is evaporated off at 80° C. and at the same time the layer of adhesive is activated by the heat treatment. The surfaces are bonded together by lightly pressing together the test samples which are covered with the activated layer of adhesive. The resistances to separation in kp/cm summarized in Table 2 were determined after nine days' storage:

| Example | Material A | Material B |
|---|---|---|
| 1 | 11.8 | 6.1 |
| 2 | 6.4 | 3.2 |
| 3 | 6.9 | 3.4 |
| 4 | 6.5 | 3.3 |
| 5 | 11.5 | 6.9 |
| 6 | 12.3 | 6.6 |
| 7 | 11.7 | 6.5 |
| 8 | 11.5 | 5.8 |
| 9 | 11.8 | 5.5 |
| 10 | 11.8 | 6.3 |
| 11 | 12.0 | 5.7 |
| 12 | 5.2 | 3.1 |

To test the stability in storage of adhesive solutions of the products obtained by the process, 20% solutions in methylethyl ketone were prepared from the dihydroxypolyurethanes according to Examples 1, 5, 6, 11 and 12. The fall in the viscosity of the solutions at 20° C. is summarized in Table 3 below and the fall in viscosity at 70° C. is summarized in the following Table 4.

| Example | Initial viscosity (mPas) | after one month | after three months |
|---|---|---|---|
| 1 | 4300 | 4100 | 4000 |
| 5 | 4800 | 4700 | 4700 |
| 6 | 5100 | 5100 | 5000 |
| 11 | 5200 | 5000 | 2300 |
| 12 | 5200 | 5300 | 5200 |

| Example | Initial viscosity (mPas) | after one month |
|---|---|---|
| 1 | 4300 | 4000 |
| 5 | 4800 | 4500 |
| 6 | 5100 | 5000 |
| 11 | 5200 | 900 |
| 12 | 5200 | 5100 |

What is claimed is:

1. In a process for bonding rubber to rubber or to other materials by coating the surfaces to be bonded with an adhesive and joining them together, the improvement wherein said adhesive is a predominately linear dihydroxypolyurethane containing from 0.01 to 1.0%, by weight, of carboxyl groups and from 0.1 to 10 milliequivalent of ionic groups per 100 g of polyurethane.

2. The process of claim 1, wherein said dihydroxypolyurethane is prepared by reacting:
   (A) dihydroxypolyesters having molecular weights of from 600 to 8,000;
   (B) organic diisocyanates;
   (C) compounds containing carboxyl groups and groups having a higher isocyanate-reactivity than said carboxyl groups; and
   (D) compounds containing ionic groups and isocyanate-reactive groups.

3. The process of claim 2, wherein said components (C) and (D) are separate compounds.

4. The process of claim 2, wherein said reaction components further comprises chain-lengthening agents.

5. The process of claim 4, wherein said chain-lengthening agents are diols having molecular weights of from 62 to 300.

6. The process of claim 5, wherein said diols have a molecular weight of from 62 to 150.

7. The process of claim 4, wherein said chain-lengthening agent is used in a quantity of from 0 to 1 mol, per mol of dihydroxypolyester.

8. The process of claim 7, wherein said chain-lengthening agent is used in a quantity of from 0.3 to 0.7 mol per mol of dihydroxypolyester.

9. The process of claim 2, wherein said reaction is a one-shot process.

10. The process of claim 9, wherein the reaction mixture is free of solvent, the reaction temperature is from 50° to 200° C. and the molar NCO/OH ratio is from 0.9:1 to 0.999:1.

11. The process of claim 10, wherein the reaction temperature is 80° to 150° C.

12. The process of claim 2, wherein said reaction is a prepolymer process.

13. The process of claim 12, wherein the molar NCO/OH ration is above 1:1 and the reaction temperature during the prepolymer stage is 50° to 150° C. and during the chain-lengthening stage is 80° to 200° C.

14. The process of claim 2, wherein said organic diisocyanates are of the following general formula:

Q(NCO)$_2$ wherein
Q represents an aliphatic hydrocarbon group having from 4 to 10 carbon atoms, a cycloaliphatic hydrocarbon group having 5 to 15 carbon atoms, an aromatic hydrocarbon group having from 6 to 15 carbon atoms or an araliphatic hydrocarbon group having 8 carbon atoms.

15. The process of claim 14, wherein Q represents an aliphatic hydrocarbon group having 6 carbon atoms, a cycloaliphatic hydrocarbon group having from 6 to 13 carbon atoms, an aromatic hydrocarbon group having from 7 to 13 carbon atoms, or an araliphatic hydrocarbon group having 8 carbon atoms.

16. The process of claim 15, wherein said organic diisocyanate is 4,4'-diphenylmethane diisocyanate.

17. The process of claim 2, wherein said dihydroxypolyesters have a molecular weight of from 1200 to 6000.

18. The process of claim 17, wherein said dihydroxypolyesters have a molecular weight of from 2000 to 4000.

19. The process of claim 2, wherein there is no solvent present in said reaction.

20. The process of claim 1, wherein said dihydroxypolyurethane contains from 0.02 to 0.4%, by weight of said carboxyl groups and from 0.5 to 5 milliequivalents of ionic groups per 100 g.

21. The process of claim 1, wherein said ionic groups are selected from the group consisting of ammonium groups, sulfonium groups, carboxylate groups, sulfonate groups, and phosphonate groups, all bound by homopolar bonds.

22. The process of claim 21, wherein said compound containing ammonium groups as the ionic group corresponds to the formula

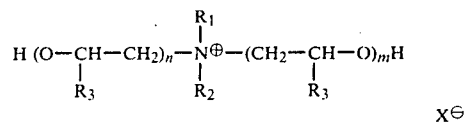

wherein
n and m each repesents an integer of from 1 to 20, preferably 1;
R$_1$ represents C$_1$-C$_8$ alkyl, preferably CH$_3$;
R$_2$ represents C$_1$-C$_8$ alkyl, preferably CH$_3$, C$_2$H$_5$, C$_3$H$_7$ or C$_4$H$_9$;
R$_3$ represents H or CH$_3$, preferably H; and
X$^\ominus$ represents R$_1$—O—SO$_3$$^\ominus$ or a halide ion, such as Cl$^{(-)}$, Br$^{(-)}$ or I$^{(-)}$.

23. The process of claim 21, wherein said compound containing sulfonium groups as the ionic group corresponds to the formula:

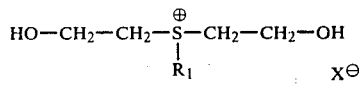

wherein R$_1$ and X are defined in claim 54.

24. The process of claim 21, wherein said compound containing sulfonate groups as the ionic group corresponds to the formula:

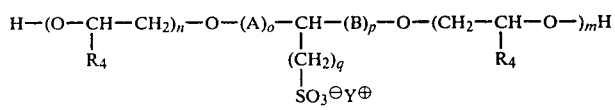

wherein
A and B, which may be the same or different, each represents an aliphatic hydrocarbon group having from 1 to 6 carbon atoms;
R$_4$ represents H or CH$_2$;
Y$^\oplus$ represents an alkali metal cation or a substituted or unsubstituted ammonium group;
n and m, which may be the same or different, each represents a number from 0 to 30;
o and p each represents 0 to 1; and
q represents an integer of from 0 to 2.

25. The process of claim 21, wherein said compound containing sulfonate groups as the ionic groups corresponds to the formula:

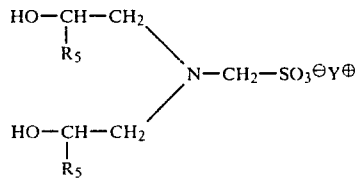

wherein $Y^{\oplus}$ is as defined above; and $R_5$ represents a $C_1$-$C_8$ alkyl group or a hydrogen atom.

26. The process of claim 21, wherein said compound containing sulfonate groups as the ionic group corresponds to the formula:

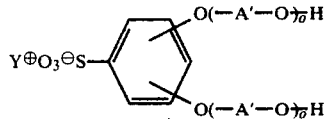

wherein $Y^{\oplus}$ is as defined above; and

A' represents a group of the following formula:

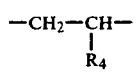

wherein $R_4$ repesents H or $CH_3$; and o represents an integer of from 1 to 15.

27. The process of claim 21, wherein said compound containing sulfonate groups as the ionic group corresponds to the formula:

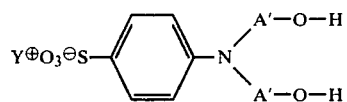

wherein $Y^{\oplus}$ and A' are as defined in claim 26.

28. The process of claim 21, wherein said compound containing phosphonate groups as the ionic groups corresponds to the formula:

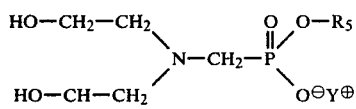

wherein $Y^{\oplus}$ and $R_5$ are as defined in claim 25.

29. The process of claim 21, wherein said compound containing phosphonate groups as the ionic group corresponds to the formula:

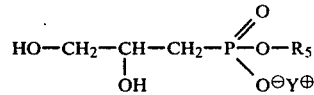

wherein $Y^{\oplus}$ and $R_5$ are as defined in claim 25.

30. The process of claim 2, wherein said compound containing carboxyl groups and groups having a higher isocyanate-reactivity than said carboxyl groups is dimethylolpropionic acid.

* * * * *